Patented Apr. 4, 1939

2,152,742

UNITED STATES PATENT OFFICE 2,152,742

OXYGEN DERIVATIVES OF CATIVIC ACID AND METHODS OF PREPARING THEM

Nicholas L. Kalman, Cambridge, Mass.

No Drawing. Application July 30, 1935,
Serial No. 33,869

8 Claims. (Cl. 260—99)

This invention relates to oxygen derivatives of an organic acid, and to methods of preparing them. The invention includes broadly also oxygen derivatives of derivatives of this organic acid.

This organic acid has never been obtained in substantially pure form heretofore, as far as I am aware, and has never been named; hence for purposes of ready identification I have given it the name "cativic acid", and will set forth hereinbelow its characteristics, and methods by which it may be obtained.

The raw material from which cativic acid is obtained is the exudate from the species of tree called *Prioria copaifera*, Gris., which tree is found abundantly in parts of tropical and semitropical countries, for example, along the Caribbean coast of Panama and Costa Rica. The exudate is properly called cativo resin, altho it is also commonly called cativo (or cateva or catteva) balsam, and also by various local names. The natural exudate is usually a greenish brown, very tacky and viscous, opaque liquid, and has, especially when heated, an unpleasant odor. Attempts to use it commercially have hertofore been without success.

I have found that about 70 to 75% of this resin exudate is an organic acid. It is to this acid, which I have succeeded in isolating in a pure state, or substantially so, for the first time, by methods hereinafter disclosed, that I have given the name "cativic acid".

Cativo resin consists of about ½% water, 0.1% ash, up to 2% volatile oil, about ½% of an unidentified acid, which has a very much lower boiling point than cativic acid. The two major constituents of cativo resin are cativic acid, as mentioned above, consisting of about 70 to 75% of the material, and another substance consisting of about 22% of the material, which substance I have found to be an ester and have named cativyl cativate, as my work indicates that it is an ester product of cativic acid and its corresponding alcohol. This alcohol I have isolated for the first time and have given it the name cativyl alcohol.

I have developed several methods for obtaining cativic acid from cativo resin. In order that the present invention will be sufficiently clear and complete, I will first describe some of these methods, and cativic acid itself. Subsequently I will set forth the particular objects to which the present invention is directed, namely, the oxygen derivatives of cativic acid and of other cativic compounds, and methods of preparing these oxygen derivatives.

Cativic acid is very viscous and tacky, semisolid, colorless or substantially so and nearly entirely odorless. All attempts at crystallization of this material have so far failed, and as in the case of similar high molecular weight non-crystallized and oxidizable organic acids, it is a very difficult matter to establish a precise chemical formula and absolute physical and chemical characteristics. It appears, however, to be a definite chemical compound, which may exist in one form or as a mixture of isomeric forms all having the same molecular formula, set forth below. Closely related compounds (having for example 2 carbon atoms more or less) may be present in traces; these would be practically impossible to isolate and identify. This chemical compound, which may or may not be present in isomeric form, I refer to as cativic acid. A series of combustions on samples of purified cativic acid give a mean of carbon 78.41%, and hydrogen 11.06%. This corresponds to a molecular formula of $C_{20}H_{34}O_2$. It will be readily apparent that the exact molecular formula of a substance having such a high molecular weight is not easy to determine. Hence this formula is advanced as being the most probable as far as I have been able to determine, and not as a positive and completely-proved formula. The mean acid number was found to be 172.3. Cativic acid has an unsaturated, ethylenic bond, but the iodine number determinations according to Wij's method yield widely varying data according to the amount of sample taken, time of reaction, etc. Refractive index was found to be 1.507 at 15° C.; specific gravity 0.9987 at 23° C.; viscosity, 100 cc. pipette at 22° C., 78.5 hours; water under same conditions, 11.6 seconds.

Cativic acid exhibits the properties of a monobasic acid, readily forming salts. It also readily forms esters, differing from abietic and other resin acids which esterify only with difficulty. Its composition in conjunction with the degree of unsaturation clearly differentiates it from the aliphatic acids. With a body of as high molecular magnitude as cativic acid, a small variation in percentage composition of hydrogen, oxygen and carbon produces a correspondingly greater apparent variation in composition, but from my researches, there is no compound of this composition or closely approaching the same which has the physical constants and other characteristics enumerated above and the ability of ready esterification.

Among the methods which I have used for obtaining cativic acid I will mention a distillation process, a neutralization process, and a solvent process. Other processes are also possible, but need not be described here.

In carrying out the distillation process, I may first filter the cativo resin (which is advantageously warmed to improve its flow) in order to remove dirt and other foreign matter. Then I subject it to heat and preferably to a slight vacuum, equal, say, to a pressure of 200 mm. of mercury, thereby driving off water and other low-boiling constituents. The pressure during this step may vary considerably. The remaining constituents, cativic acid and cativyl cativate, do not distill while the temperature is below about 200° C., even at a very low absolute pressure. (Pressures, in this specification, are given in millimeters of mercury, and are absolute pressures.) Now, on raising the temperature above 200° C., with a low pressure (below 10 mm., preferably), cativic acid is distilled, leaving cativyl cativate as the residue. Care should be taken, during the distillation, to keep the pressure low; with higher pressures (e. g., 10 mm. or over) there is a tendency for cativic acid to lose $CO_2$, forming the hydrocarbon which I call "cativene". Cativene boils at about 160° C. at 3 mm. However, once the distillation of cativic acid is well under way, at the indicated low pressure, there is little or no further trouble from cativene formation, and any cativene which came over early in the distillation may be separated by further fractional distillation or by neutralization of the cativic acid, or by other suitable means. When the neutralization method is used, an alkali such as caustic soda together with a suitable solvent such as water is used, and the cativic acid separated from the other materials including cativene, in the same general way as outlined below under the neutralization process. There is also some tendency for cativic acid to oxidize especially at elevated temperatures. This can be avoided by distilling in the absence of oxygen, e. g., in an atmosphere of nitrogen or carbon dioxide.

By the neutralization process for obtaining cativic acid, it is possible to obtain all the cativic acid contained in cativo resin, whether present as such, or combined with cativyl alcohol as cativyl cativate. A simple procedure is to heat or boil the cativo resin with an aqueous (or alcoholic, or aqueous-alcoholic) caustic solution, whereby the cativyl cativate is easily saponified. All of the resin, except for a small amount of dirt and like impurities, which are readily removed by filtration, is now in solution. Dilution, at least to a considerable degree, of this solution with water is possible, without apparent precipitation, the cativyl alcohol being undoubtedly held by the soap solution. To separate these ingredients, the soap solution is shaken out with a solvent immiscible with water or the alkali cativate. Petroleum ether or ethyl ether may be used as such a solvent. The cativyl alcohol is thus dissolved out in the solvent phase, and may be recovered as desired. The alkali cativate, contained in the other phase, may be decomposed (hydrolyzed) in well-known manner by addition of a comparatively strong acid, whereby cativic acid is produced. Cativic acid may then be readily separated from the other materials—which exist as a water solution of alkali salt, alcohol (if any has been used), and any excess of the strong acid—since cativic acid is insoluble therein at the relatively high water-content then existing in said solution.

In carrying out the solvent process for obtaining cativic acid, the cativo resin is first treated with an approximately 75% alcoholic solution; cativic acid goes into solution but the undesirable impurities and other ingredients remain as a bottom sludge. The alcoholic-aqueous solution may be poured off or filtered, and cativic acid may be recovered therefrom in several ways. For instance, the alcohol solution may be distilled or diluted until the alcohol content is about 50% or less, in which mixture cativic acid becomes thereby substantially insoluble, and the acid thus separated may be, if so desired, taken up by a solvent immiscible with the 50% aqueous alcoholic solution, like petroleum ether or other high-boiling, aliphatic hydrocarbons, and thus separated. Cativic acid then may be recovered by evaporation of the solvent, preferably in a non-oxidizing atmosphere. Or, the 75% alcoholic solution may be shaken out with an immiscible solvent such as certain aliphatic hydrocarbons, part of cativic acid going into the hydrocarbon solution. After the separation of the solvent, the 75 alcohol solution containing some cativic acid may be used again for extraction of another portion of cativo resin, etc., and the solution freed from the solvent if so desired and cativic acid then obtained. Or, the solution may be used as such. The 75% alcoholic solution may be decolorized, or substantially so, if so desired, for instance, by adding sodium hydrosulphite in the amount of .2% of the total weight, shaking out for a while, possibly gently heating, and preferably filtering. Decolorization of color imparting constituents of cativic acid may be also accomplished by sunlight, or by sources of suitable artificial light which has an excellent decolorizing effect thereon, especially in solution.

The oxygen derivatives of cativic acid and of cativic acid derivatives, and methods of preparing them, form the principal objects of this invention.

Oxidized cativic acid may exist in various forms, as will be described in more detail below. These are referred to, as a group, as oxidized cativic acid. Derivatives of oxidized cativic acid may thus be derivatives of the various forms in which oxidized cativic acid exists, and include for example esters of oxidized cativic acid, heavy metal salts of oxidized cativic acid, etc. These will also be described in more detail below.

Oxidized cativic acid may be prepared directly from cativo resin, or from the isolated cativic acid. Or it may, if desired, be prepared from cativic acid derivatives. The derivatives of oxidized cativic acid may be prepared by first making oxidized cativic acid and then making the derivatives, e. g., by esterification, if esters of oxidized cativic acid are desired. Or the derivatives of cativic acid, such as the esters or metal salts, for example, may first be made from cativic acid, and the resulting derivatives be then oxidized.

Various types of oxidized cativic acid will now be described, together with methods of preparing them.

The first type, to which I will refer as oxy-cativic acid, may be prepared by dissolving cativo resin and a catalyst in an organic solvent, in which both are preferably soluble, such organic solvent being preferably unaffected by oxygen or other oxidizing agent used under the conditions of the present procedure.

For instance, cativo resin may be dissolved or diluted with acetone, in order to reduce its viscosity and/or to make it more workable, and to this reaction mass cobalt cativate may be added, let us say, in the amount of 1% of the cativo resin used. Cativo resin, cativic acid, and cativic acid esters all oxidize without the aid of catalyzers, but such an oxidation is very slow indeed. Therefore, to obtain considerable quantities of oxidized cativic products, and in a fairly short time, and also with not too bulky an apparatus, it is distinctly preferable to use catalyzers to speed up the oxidation reaction. While, for simplicity's sake, in the examples to be followed, cobalt cativate is specified, it is understood that other catalytic agents, used for oxidation, may be employed instead or in addition. I refer especially to other salts having catalytic effect in oxidations, such as lead, manganese, iron, etc., salts, whether in organic or inorganic combination. Other non-salt type of catalysts may be used also, such as oxides, hydroxides, etc. Most of these latter catalysts, however, are insoluble in the media employed, but they are nevertheless usable. But, as a general rule, it is preferable to work with catalysts soluble in the reaction mixture. Cobalt cativate is additionally advantageous in that it does not introduce any extraneous reagent (other than the metal) into the ingredients. Cativo resin may be oxidized directly, without dissolving or dilution, but as it is very viscous at the usual room temperatures, either good mechanical mixing should be provided for, or the temperature should be raised. While doing the latter, it should be borne in mind that the temperature should not be as high as to cause undesirable effects and/or unwished for reaction-products. If a gaseous oxidizing agent is used, like oxygen, air or other gases having an oxidizing effect, cativo resin, cativic acid or its esters may be made to drop or drip down by gravity thru appropriate apparatus and, with the proper distributing arrangement, be met by the oxidizing gas entering at or near the bottom, or any other convenient point, on the counter-current principle. Other mechanical contrivances and methods may be used, the purpose of such arrangements being a more thorough contact between the reactants, thus obtaining a more speedy and more complete reaction.

The oxidation may be performed at atmospheric pressure, or at pressures slightly or considerably above that, or even at partial vacuums. The temperature may be also varied but within the limits to obtain the desired effects.

For instance, 100 g. of cativo resin is diluted with 50 g. acetone, 1 g. cobalt cativate added, and the apparatus charged with oxygen until the pressure reaches 30 lbs. During this and/or afterwards the apparatus is shaken so as to achieve a more thorough mixing of the reactants. After some interval, usually a few hours, the oxidation becomes pronounced and the pressure gradually decreases until it reaches a stationary point, when the reaction is finished. The mean increase of weight of several runs made in this manner was 5.1%, while the theoretical required amount for 1 mol of cativic acid present would be 1 atom of oxygen, and for 1 mol of cativyl cativate present 2 atoms of oxygen, resulting in a theoretical weight increase which is likewise 5.1%.

The oxidized cativic acid thus obtained is visualized as having 1 atom of oxygen added at the place of the double bond, resulting in a compound of the presumptive type of

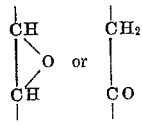

This product I call "oxy-cativic acid".

Oxy-cativic acid may be separated from the reaction mixture obtained by oxidizing cativo resin in solution as just described, or otherwise, in the following manner:

For instance, if cativo was oxidized in acetone solution, HCl may be added to the acetone solution to convert the organic cobalt salt into cobalt chloride, and eliminate it in this form from the reaction mixture. This elimination of cobalt may be done at this time and in this manner, or at some subsequent time and in some other suitable manner to suit the convenience of the operator. The acetone solution is then diluted with water until the oxidized products of cativo resin precipitate out, or substantially so. Then the aqueous acetone may be poured off, and, if so desired, the residue washed one or more times with water or acidulated water. The residue may be now taken up by a solvent thereof, which solvent may or may not be miscible with water, e. g., ethyl alcohol, or relatively high boiling aliphatic hydrocarbons. If the solvent employed is miscible with water, as for instance when ethyl alcohol is used, then the solution may be neutralized with aqueous, or alcoholic, or aqueous-alcoholic caustic, by which treatment the alkali soaps of the oxy-cativic acid are formed. By subsequent dilution with water these alkali soaps will remain in solution but the other constituents of cativo will precepitate. This precipitate in turn, if so desired, may be taken up by a solvent immiscible with water or aqueous alcohol, such as relatively high boiling aliphatic hydrocarbons. The immiscible layers separate, and the soap solution containing some impurities is washed possibly anew with the solvent, composed of these hydrocarbons. The soap layer now will be free or substantially so from the contaminating materials composed of the non-acidic products contained in cativo, in such a state as they are present after the oxidation treatment. Now this soap solution may be acidified with an inorganic acid or a strong organic acid. The thus precipitated oxy-cativic acid may be in turn taken up with a solvent immiscible with water, and after evaporating the solvent at a temperature under the decomposition temperature of oxy-cativic acid, oxy-cativic acid is obtained. In order to free this oxy-cativic acid from parts of still unoxidized cativic acid, the product may be treated with a solvent which will not dissolve oxy-cativic acid but in which cativic acid will go into solution. After the unreacted cativic acid is eliminated in this manner and the solvent has been evaporated at fairly low temperature, pure oxy-cativic acid remains.

If cativic acid has been used for the preparation of oxy-cativic acid, the process is essentially the same as described above, only naturally it is not necessary to eliminate the other constituents of the cativo resin.

Oxy-cativic acid may be also separated from the reaction mixture by some of the processes described for the separation of the unoxidized cativic acid but it should be borne in mind that oxy-cativic acid easily decomposes under the boiling point of water and therefore if heat is applied at all, it should not be as high as to be detrimental. It should also be remembered that the oxy-products as a rule are more soluble in alcohol and water than the corresponding unoxidized products, and for instance, a corresponding variation in the aqueous alcoholic process should be pursued herein.

One method of preparing the oxy-cativic esters is to start with cativo resin, or with cativic acid obtained therefrom, and first prepare the oxy-cativic acid, as above described, and then esterify the same. But here it should again be remembered that those esterifications which require a comparatively high temperature cannot be made in this manner because oxy-cativic acid will decompose before esterification will take place. The oxy-esters may be prepared on the other hand by making the esters of cativic acid first, and then oxidizing these esters. For the preparation of such esters as for instance glyceryl oxy-cativate, or mixed glyceryl esters of acetic acid and oxy-cativic acid, the unoxidized esters should be prepared first, and then oxidized afterwards.

As an illustrative example of the preparation of the oxy-esters by oxidation of the already formed ester, I will mention the preparation of butyl oxy-cativate. Butyl cativate may be used as such. More viscous or semi-solid esters may, if so desired, be mixed with a solvent (to reduce viscosity) which will be suitable for the oxidation process, such as acetone. The ester, with or without solvent, is mixed with a small amount, let us say 1%, of cobalt cativate, or any other suitable catalyst. The oxidation may be carried out at room temperature or slightly above, using, let us say, 30 pounds of pressure, and with oxygen, air, or other oxidizing gas. The reaction products may be advantageously stirred or shaken in order to facilitate the mixing of the reactants. After a comparatively short time, the oxidation proceeds smoothly as manifested by the decreasing pressure. The weight increase of the reaction product is about the weight increase calculated for the addition of 1 atom oxygen to 1 molecule of ester, in this instance, butyl cativate.

The butyl oxy-cativate may be isolated for instance by shaking out with HCl, drawing off the more or less dilute HCl or neutral solution and, if so desired, washing and possibly drying the butyl oxy-cativate. The oxidized ester may be vacuum distilled as it does not decompose by this treatment, at least if a satisfactory vacuum is used. But before heating any oxy-products to a relatively high temperature, care should be taken to destroy any possible peroxides present, in the customary manner, in order to avoid any possibility of decomposition, etc. The oxidized ester may be also readily obtained, after the elimination of the cobalt, by subjecting the whole reaction mass, even if cativo resin was the starting material, to vacuum distillation. The procedure here is essentially the same as described for the vacuum distillation of the unoxidized cativic esters when cativo was directly esterified, as described in my copending application, Serial No. 33,691, filed July 29, 1935. In other words, the lower boiling constituents are separated under 200° C. at, let us say, about 20 millimeters pressure. At a higher temperature, the oxy-ester distills over. The oxidized cativyl cativate remains as an undistillable residue in the retort.

Butyl oxy-cativate is a substantially colorless and odorless limpid liquid, but its effect on cellulose derivatives is considerably more pronounced than that of the unoxidized esters. For instance butyl cativate mixed with nitrocellulose has apparently no gelling effect on it. On the other hand butyl-oxy cativate in conjunction with nitrocellulose will cause a swelling and gelling of the nitrocotton, and if heated for a while, an evidently uniform viscous mass is obtained, thus proving the superior action of the oxy-ester in conjunction therewith.

The second type of oxidized cativic acid, to which I refer as dihydroxy cativic acid, has two hydroxyl groups at the double bond, viz. the original —CH=CH— is converted into

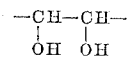

This same configuration is present in the derivatives of dihydroxy-cativic acid, such as dihydroxy-cativic acid esters and in the metal salts of dihydroxy-cativic acid.

Dihydroxy-cativic acid may be prepared by the oxidation of an alkali cativate, such as sodium cativate, with a solution of an alkali permanganate, such as potassium permanganate, or any equivalent oxidizing agent. The permanganate oxidation will now be described. In order to achieve the high yield and desirable purity of the required product, it is advantageous to use dilute, for instance a 1%, solution of sodium cativate, and also to use a dilute, for instance a 2%, potassium permanganate solution. It is also preferable to oxidize the dilute solution at a low temperature, for instance, below 5° C. The usual practice is to add the permanganate solution slowly to the alkali cativate solution, a good mixing device being employed in order to avoid local over-oxidations. After all the permanganate has been added, the reaction mass may be left standing, with or without agitation, for a while and then filtered from the precipitated manganese dioxide (which may be more or less hydrated). Or if so preferred, this manganese dioxide may be brought into solution, for instance with sodium bisulfite. Afterwards, the clear solution is precipitated with a relatively strong acid, such as $H_2SO_4$, at which time the dihydroxy-cativic acid precipitates out either as a gummy mass or in a crystalline form, or both ways, according to the efficacy of the reaction. The supernatant acid liquid may be poured off, or filtered, and the residue worked up in various ways.

This residue, which consists of the insoluble oxidation products of cativic acid, may be washed with water, and if so desired, dried. Before or after this treatment it may be extracted with petroleum ether in which the dihydroxy-cativic acid is insoluble but which takes into solution any unoxidized cativic acid and various other products that may be present. Or the oxidized and precipitated reaction-products may be dissolved, with or without previous drying, in benzol in which both acids are soluble. Then a sufficient amount of petroleum ether is added to precipitate the dihydroxy-cativic acid, while everything else remains in solution. This precipitated dihydroxy-cativic acid may be preferably washed with petroleum ether to eliminate the impurities still present, and then dried, or it may be, before or after this treatment, crystallized, for instance, by dissolving it in hot benzol and carefully adding petroleum ether until cloudiness starts to appear and then cooling the mass. The dihydroxy-cativic acid which has crystallized out in the cold, is preferably washed with petroleum ether, and then dried.

The dihydroxy-cativic acid thus obtained is a crystalline solid, white and odorless. A representative sample of this was found to have a melting point of 154° C. and an acid number of 162.2. The combustion of the sample yielded: carbon 70.29%, and hydrogen 10.5%. Dihydroxy-cativic acid is insoluble in water, somewhat soluble in methyl, ethyl, propyl and butyl alcohols, and their corresponding acetates; insoluble in petroleum ether and slowly soluble in acetone and methyl-ethyl ketone; toluene, and xylene; furthermore it is soluble in benzene and the higher-boiling aliphatic hydrocarbon solvents. This disydroxy-cativic acid may also be prepared directly from cativo resin. For instance, cativo resin is refluxed with the theoretical amount of caustic alkali, calculated to neutralize the acids present in cativo resin, and to saponify the ester present therein, or some excess of caustic alkali may be used for this purpose. After a short refluxing, a light brown solution is obtained. This is diluted with water to keep the soaps formed in solution and if so desired, filtered, but as the amount of insoluble is exceedingly small, and is mostly mechanically admixed fine material, the filtration might as well be dispensed with in most cases. As the soap solution contains cativyl alcohol, it may be found preferable to eliminate this alcohol, which may be done by shaking out the soap solution with a volatile immiscible solvent, such as petroleum ether, diethyl ether, high boiling petroleum fractions, etc., which will not, at least to any practical degree, dissolve the soaps present. Cativyl alcohol will go into solution in these organic solvents, and thus the soap solutions will be free, or at least substantially so, of cativyl alcohol after such a treatment. Now the soap solution may be further diluted and oxidized with permanganate.

Another variant, especially in the case where it is desired to preserve cativyl cativate, is the procedure in which cativo resin is dissolved, preferably in a solvent which does not dissolve soap or at least very little of it, such as has been mentioned above, and either the solution of the cativo resin or the resin itself is shaken out or triturated with an aqueous alkali solution in a concentration and containing an amount of caustic soda assuring the desired effect. Subsequently this alkali solution is oxidized by an oxidizing agent such as permanganate, which will yield the dihydroxy-cativic acid. Dihydroxy-cativic acid is, at least to some extent, compatible with the commonly used cellulose esters and with some of the cellulose ethers. An interesting effect may be obtained by, for instance, using about 2 parts of dihydroxy-cativic acid to 3 parts of cellulose acetate in the proper solvent mixture. After the evaporation of the solvents, dihydroxy-cativic acid crystallizes out in long needles, giving an interesting and pleasing star effect. The esters of dihydroxy-cativic acid may be prepared by several of the methods described for the preparation of the esters of cativic acid and oxy-cativic acid, but it should be borne in mind that the dihydroxy-cativic acid, and its derivatives, although considerably more stable than oxy-cativic acid, is nevertheless somewhat heat-sensitive, and will decompose under the influence of a high temperature. Consequently, excessive heat should be avoided when making dihydroxy-cativic acid or its derivatives.

As an example of a method of making an ester of dihydroxy-cativic acid, I will give the following: The methyl ester of dihydroxy-cativic acid may be prepared by dissolving dihydroxy-cativic acid in several times its weight of methyl alcohol, as dihydroxy-cativic acid is not very soluble in this medium. The mixture is treated with an esterifying agent, for instance dry hydrochloric acid gas. This may be done while the mixture is cold or heated. After the completion of the esterification, the solution is diluted with water, and the methyl ester of dihydroxy-cativic acid precipitates out as a white, odorless solid. A sample of the product so obtained had a melting point of 64–65° C., an ester number of 157.4, and an acid number of 0. It was insoluble in water and petroleum ether, soluble in methyl-ethyl ketone, and the aromatic hydrocarbons, very soluble in acetone, in methyl, ethyl and butyl alcohols, and their corresponding acetates, and ethyl ether. It is compatible with nitrocellulose and at least to some extent with cellulose acetate.

A third type of oxidized cativic acid will be described—as a further example of this invention—in the embodiment of its methyl ester. I shall refer to this acid as peroxy-cativic acid, and shall describe a method for making the corresponding methyl ester, methyl peroxy-cativate. The corresponding cativic acid ester (methyl cativate in this example) is oxidized with a strong hydrogen peroxide solution, say of 30% volume strength, and in the presence of concentrated acetic acid. An oxidized ester is thus formed, the constitution of which has not yet been definitely established, but the characteristics of which show it to be a different type of compound than the other above-mentioned oxidized methyl esters of cativic acid. A sample made by the process just described, for instance, yielded an odorless viscous light yellow liquid, the boiling point of which was 235° C. at 10 millimeters pressure of mercury. The specific gravity was found to be 1.0522 at 20° C. The viscosity with a 25 cc. pipette at 20° C. was 156 minutes, as compared with 12.8 seconds for water under identical conditions. The refractive index of this sample was 1.4943 at 24° C. and the ester number 176.7. It was insoluble in water and very soluble in a wide range of solvents including methyl, ethyl, propyl, and butyl alcohols, the acetates of these alcohols; aromatic hydrocarbons, ethyl ether and petroleum ether, acetone and methyl-ethyl ketone. This product is not only compatible with nitrocellulose but also with cellulose acetate.

If this product is further methylated and the resulting ester vacuum distilled, a viscous liquid results which is substantially odorless, light yellow, and has a boiling point from 215 to 228° C. at 8 millimeters. The specific gravity of a sample was found to be 1.0237 at 20° C., the viscosity with a 25 cc. pipette at 22° C. 39 min. 26.6 sec., as against 12.8 sec. for water under the same conditions. The refractive index of the same sample was 1.5048 at 24° C.; the ester number 142.5. It was soluble in aliphatic alcohols and the corresponding acetates, in aromatic hydrocarbons, in ether and petroleum ether, and in acetone. In general, the low evaporative tendencies, high stabilities, good compatibilities, excellent adhesion, solubility in the common solvents used for the purpose in mind, of a range of peroxy-cativic acid esters obtained by this hydrogen peroxide-acetic acid method or variations thereof, make them useful ingredients in the cellulose arts.

Metal salts of oxidized cativic acid may be prepared in the same manner as set forth for metal salts of cativic acid in my copending application, Serial No. 664,551, filed April 5, 1933, taking into consideration such obvious modifications as would follow from differences in boiling point, stability, solubility, and other physical characteristics of the reagents and products. For example, oxidized cativic acid, as far as it is stable at the temperature of reaction, may be fused with the desired metallic oxides or hydroxides or carbonates, for example, the water (and carbon dioxide, if any) passing off as a gas and the oxidized metal cativate remaining. Or an alkali salt of oxidized cativic acid such as the sodium salt may be reacted with a compound of the desired metal, both in solution, and the resulting oxidized metal cativate removed as an insoluble precipitate. Alternately it may be preferable in certain instances to prepare the metal cativate first, and then oxidize whereby the corresponding metal salt of oxidized cativic acid is produced. The metal salts of oxidized cativic acid include both such metal salts as the alkali metal salts (e. g., sodium, potassium, etc.) and such salts as the heavy metal salts (e. g., Ca, Mg, Al, Co, Fe, etc.). Inasmuch as the esters of oxidized cativic acid are salts of organic acids, the term salts of oxidized organic acids includes both the esters and the metal salts.

The compounds above mentioned including oxidized catavic acid and the derivatives thereof including salts were made by me for the first time, so far as I am aware, and are therefore new chemical compounds. The compounds have many fields of utility as pointed out elsewhere herein.

The physical and chemical properties of oxidized cativic acid and of the derivatives of oxidized cativic acid render these compounds suitable for use in many fields, such as in lacquers and coating compounds, plastics and resinous compositions, adhesives, etc. By proper selection, from among these several oxidized compounds, to obtain the desired characteristics—e. g., as to boiling point, viscosity, quantity, etc.—a considerable degree of variation in the characteristics of the finished product may be secured. The applicability of these oxidized compounds in the cellulose derivatives arts is of particular interest, as will be pointed out in more detail below.

In general, the low evaporative tendency, exceedingly high viscosity and strength and tenacity of adhesion, high stability, absence of tendency to hydrolyze and split off free acid, ready miscibility over a wide range of proportions with the solvents and non-solvents, both volatile and fixed, liquid and solid, used in the cellulose ester and cellulose ether industries, and their excellent solubility and high gelatinizing power for cellulose derivatives, renders these oxidized compounds of great use in many branches of the art of cellulose compounds. This is true of the oxidized cativic acids as well as of their compounds. For example, oxy-cativic acid may be mixed with equal parts of nitrocellulose, with the aid of ordinary lacquer solvents, and a film or sheet formed therefrom will be clear, colorless, and non-tacky.

While the constants for the several bodies herein recorded are to be regarded as rather illustrative than absolute, and the esters herein recorded as but specific examples, I having found that the methyl, ethyl, propyl, n-butyl and n-amyl, glycol, glycerol and other esters of oxidized cativic acid form a series of bodies possessing a number of desirable physical properties required in cellulose derivatives. The oxidized cativic acid and esters prepared therefrom, some of them dissolvants, some gelatinants, and some non-solvent softeners for cellulose derivatives, may be mixed in proportions with other solvents, non-solvents and softeners used in the cellulose derivatives art, being especially valuable on account of their low volatility, absence of hygroscopicity, low evaporative speed, lack of odor, lack of color when pure, and the clarity, transparency and high tensile strength of films, sheets, filaments, threads and similar products prepared therefrom in conjunction with cellulose derivatives.

The metal salts of oxy-cativic acid have in general a good solubility in many solvents and diluents used commercially in the cellulose ester and cellulose ether arts, and in the paint and varnish industries, and can be advantageously used as stabilizers, lacquer materials, fillers, etc. These salts are either colorless or of a very light color (except, of course the showing of the basic colors due to the presence of their respective elements), and substantially odorless.

As already pointed out, the term "oxidized cativic acid" includes the various forms such as the oxy-cativic acid, dihydroxy-cativic acid, to which reference has been made. In the same way, I use the term "derivative of oxidized cativic acid" to include derivatives of any of the various forms in which oxidized cativic acid can be prepared. This term is independent of the step by which the product has been made, that is to say it is equally applicable either to a given product made by oxidizing a derivative of catavic acid or to the same product made by preparing the corresponding derivative of the correspondingly oxidized cativic acid. Thus, an ester of oxidized cativic acid may be made by esterifying oxidized cativic acid or by oxidizing the already prepared cativic acid ester so that the cativate radical is correspondingly oxidized. The oxidizing occurs of course on the cativate radical in all cases, and this ivention is not concerned with the oxidizing or not of any other radicals of the products, or with the presence or absence of oxygen therein. Hence this confirms the selection of the term "derivatives of oxidized cativic acid", rather than "oxidized derivatives of cativic acid", as being more proper, still bearing in mind the definitions just given.

The present application is a continuation-in-part of my copending application, Serial No. 611,114, filed May 13, 1932, for Solvents for cellulose derivatives.

I claim:

1. An oxidized acid related to cativic acid, said acid being selected from the group consisting of oxy-cativic acid, dihydroxy-cativic acid, and peroxy-cativic acid.

2. Dihydroxy-cativic acid, having an elementary composition corresponding substantially to the empirical formula $C_{20}H_{36}O_4$, being a white crystalline solid and having a melting point of approximately 154° C.

3. A process which comprises dissolving cativic acid in a solvent therefor, oxidizing said cativic acid in the presence of an oxidation catalyst by reacting it with oxygen under pressure, and precipitating the oxidized cativic acid by addition of a non-solvent, said process taking place at a temperature below the boiling point of water.

4. A process which comprises dissolving cativic acid in a solvent therefor, oxidizing said cativic acid by reacting it with oxygen under pressure, and precipitating the oxidized cativic acid by addition of a non-solvent, said process taking place at a temperature below the boiling point of water.

5. A process which comprises dissolving cativic acid in a solvent therefor, oxidizing said cativic acid in the presence of an oxidation catalyst by reacting it with oxygen, and precipitating the oxidized cativic acid by addition of a non-solvent thereof, said process taking place at a temperature below the boiling point of water.

6. A process which comprises dissolving cativic acid in a solvent therefor, oxidizing said cativic acid by reacting it with oxygen, and precipitating the oxidized cativic acid by addition of a non-solvent thereof, said process taking place at a temperature below the boiling point of water.

7. A process which comprises dissolving cativic acid in a solvent therefor, oxidizing said cativic acid in the presence of an oxidation catalyst by reacting it with oxygen, and precipitating the oxidized cativic acid by addition of a non-solvent thereof.

8. A process which comprises dissolving cativic acid in a solvent therefor, oxidizing said cativic acid by reacting it with oxygen, and precipitating the oxidized cativic acid by addition of a non-solvent thereof.

NICHOLAS L. KALMAN.